(12) United States Patent
Giauque et al.

(10) Patent No.: US 8,807,514 B1
(45) Date of Patent: Aug. 19, 2014

(54) ACCESSORY ATTACHMENT SYSTEM

(71) Applicants: Paul R. Giauque, Fargo, ND (US);
Hailey M. Giauque, Fargo, ND (US)

(72) Inventors: Paul R. Giauque, Fargo, ND (US);
Hailey M. Giauque, Fargo, ND (US)

( * ) Notice: Subject to any disclaimer, the term of this patent is extended or adjusted under 35 U.S.C. 154(b) by 0 days.

(21) Appl. No.: 13/678,231

(22) Filed: Nov. 15, 2012

Related U.S. Application Data (60) Provisional application No. 61/559,869, filed on Nov. 15, 2011.

(51) Int. Cl.
*F16M 13/00* (2006.01)
*A01G 9/02* (2006.01)

(52) U.S. Cl.
USPC ............... 248/545; 248/156; 248/310; 47/39

(58) Field of Classification Search
USPC ........ 248/165, 168, 219.4, 156, 218.4, 230.1, 248/310, 346.06, 530, 545; 211/78, 107, 211/110; 119/52.2, 57.8, 61.5, 68, 69; 47/39
See application file for complete search history.

(56) References Cited

U.S. PATENT DOCUMENTS

| | | | | |
|---|---|---|---|---|
| 3,194,403 | A * | 7/1965 | Van Horn, Jr. | 211/78 |
| 3,332,654 | A * | 7/1967 | Jacobson | 211/107 |
| 3,888,354 | A * | 6/1975 | Margolin et al. | 211/110 |
| 4,732,112 | A * | 3/1988 | Fenner et al. | 119/52.2 |
| 5,037,049 | A * | 8/1991 | Funk | 248/165 |
| 5,161,561 | A * | 11/1992 | Jamieson | 135/16 |
| 6,149,119 | A * | 11/2000 | O'Connell | 248/545 |
| 6,386,142 | B1 * | 5/2002 | Holscher et al. | 119/57.8 |
| 7,412,798 | B2 * | 8/2008 | Boxsell | 47/39 |
| 7,857,274 | B1 * | 12/2010 | Parks | 248/310 |

* cited by examiner

*Primary Examiner* — Tan Le
(74) *Attorney, Agent, or Firm* — Jason L. Gilbert (57) ABSTRACT

An accessory attachment system for securing a dish such as a water feeder as well as a hook for hanging various items to a stake. The accessory attachment system generally includes clamp member adapted to be removably secured to a stake. An attachment member is provided which is secured at a first end to the clamp member. A second end of the attachment member includes a hook member for suspending a hanging plant as well as a horizontal portion adapted to retain a dish member thereon via use of a dish mount member. A dispenser holder extending from the dish member may be utilized to support a dispenser such as a bottle, which will automatically feed the dish member with its contents due to force of gravity.

15 Claims, 9 Drawing Sheets

ACCESSORY ATTACHMENT SYSTEM

CROSS REFERENCE TO RELATED APPLICATIONS

I hereby claim benefit under Title 35, United States Code, Section 119(e) of U.S. provisional patent application Ser. No. 61/559,869 filed Nov. 15, 2011. The 61/559,869 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to an attachment aiding device and more specifically it relates to an accessory attachment system for securing a dish such as a water feeder as well as a hook for hanging various items to a stake.

2. Description of the Related Art

Any discussion of the related art throughout the specification should in no way be considered as an admission that such related art is widely known or forms part of common general knowledge in the field.

Landscaping has been utilized for centuries to improve the aesthetic appeal of various types of areas, such as residences and businesses. Generally, stakes such as shepherd's hooks have been increasingly popular in such landscaping designs. Further, light posts are often necessary which lack any aesthetic appeal.

While there have been various designs of stakes, light posts and the like to make them more aesthetically appealing, there has not been a single attachment device which may be utilized to secure a dish such as a bird feeder as well providing a structure for supporting a hanging plant to such stakes to improve their aesthetic appeal and to attract various wildlife such as birds.

Because of the inherent problems with the related art, there is a need for a new and improved accessory attachment system for securing a dish such as a water feeder as well as a hook for hanging various items to a stake.

BRIEF SUMMARY OF THE INVENTION

The invention generally relates to an accessory attachment system which includes a clamp member adapted to be removably secured to a stake. An attachment member is provided which is secured at a first end to the clamp member. A second end of the attachment member includes a hook member for suspending a hanging plant as well as a horizontal portion adapted to retain a dish member thereon via use of a dish mount member. A dispenser holder extending from the dish member may be utilized to support a dispenser such as a bottle, which will automatically feed the dish member with its contents due to force of gravity.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 8 illustrate an accessory attachment system 10, which comprises a clamp member 20 adapted to be removably secured to a stake 12. An attachment member 30 is provided which is secured at a first end 31 to the clamp member 20. A second end 32 of the attachment member 30 includes a hook member 36 for suspending a hanging plant 14 as well as a horizontal portion 34 adapted to retain a dish member 40 thereon via use of a dish mount member 50. A dispenser holder 60 extending from the dish member 40 may be utilized to support a dispenser 16 such as a bottle, which will automatically feed the dish member 40 with its contents due to force of gravity.

B. Clamp Member

Figure 1:
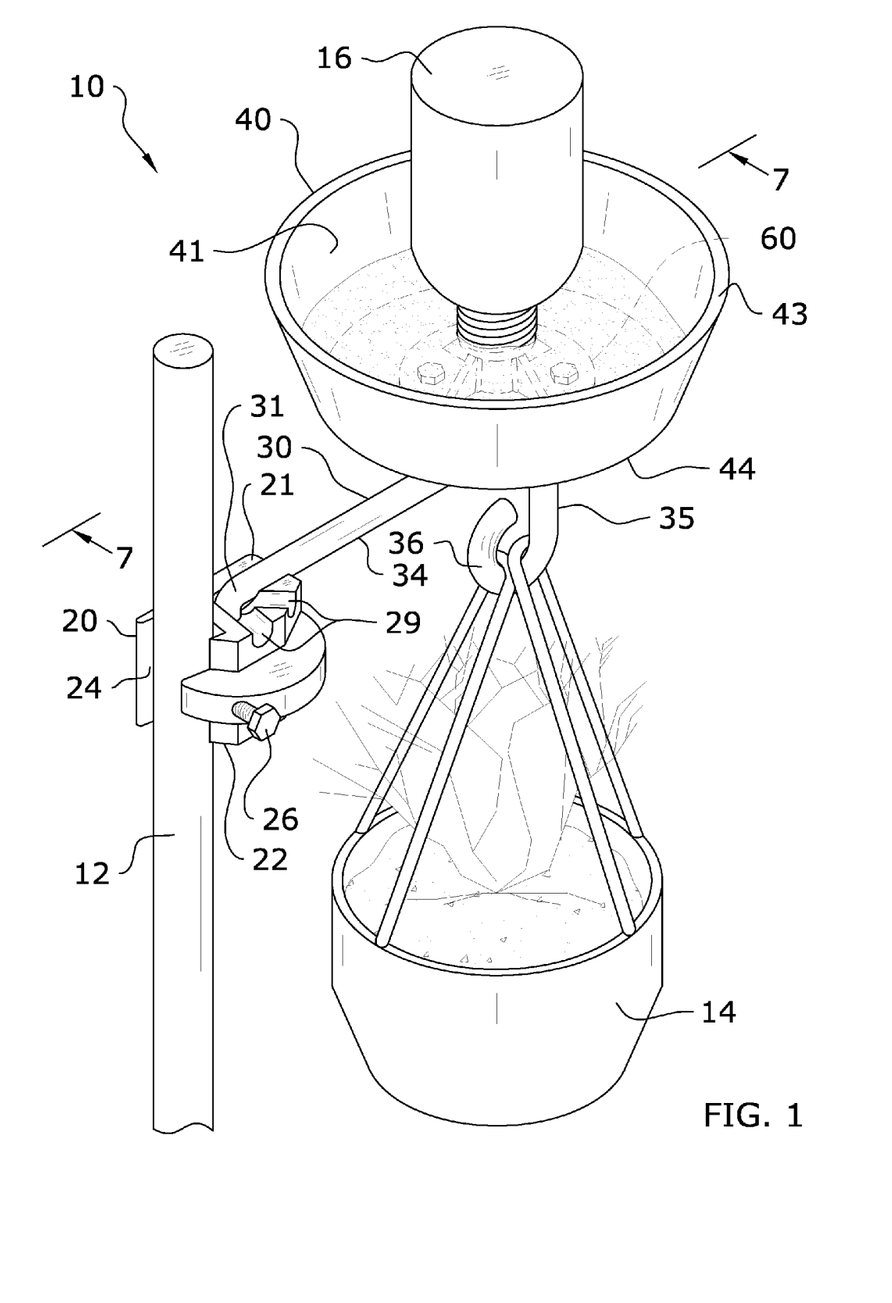
FIG. 1 is an upper perspective view of the present invention as fully assembled.
Figure 2:
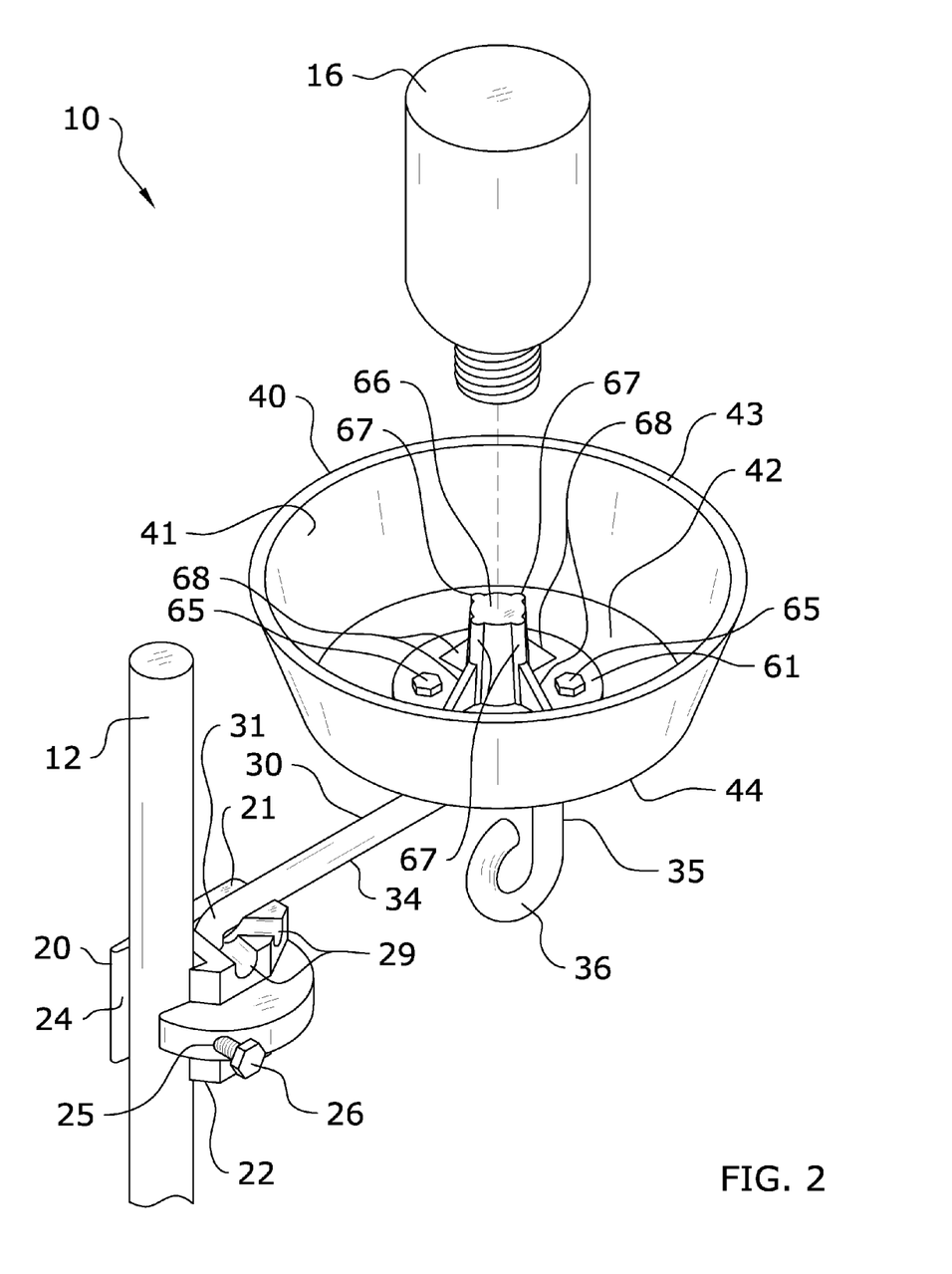
FIG. 2 is an upper perspective view of the present invention illustrating alignment of the dispenser with the container holder.

As shown in FIG. 1, the present invention includes a clamp member 20 which is adapted to removably secure to an elongated, upright member such as a stake 12 or shepherd's hook. The clamp member 20 may be comprised of various configurations and includes an upper end 21 and a lower end 22.

A vertical slot 24 is formed within the body of the clamp member 20 to removably receive the body of the stake 12 so that the clamp member 20 may be secured thereto. Preferably, a locking aperture 25 will extend through the clamp member 20 horizontally in a position adjacent the vertical slot 24 such that a securing member 26 may be extended through the aperture 25 to frictionally engage with the stake 12 and thus retain the clamp member 20 in a secured position around the stake 12. Various types of securing members 26 may be utilized, though a preferred embodiment of the present invention will utilize a fastener such as a bolt or screw.

The upper end 21 of the clamp member 20 includes a mounting aperture 28 extending vertically therethrough. When in use, the first end 31 of the attachment member 30 will be positioned within the mounting aperture 28 of the clamp member 20 such that the attachment member 30 is secured within the clamp member 20.

Figure 3:
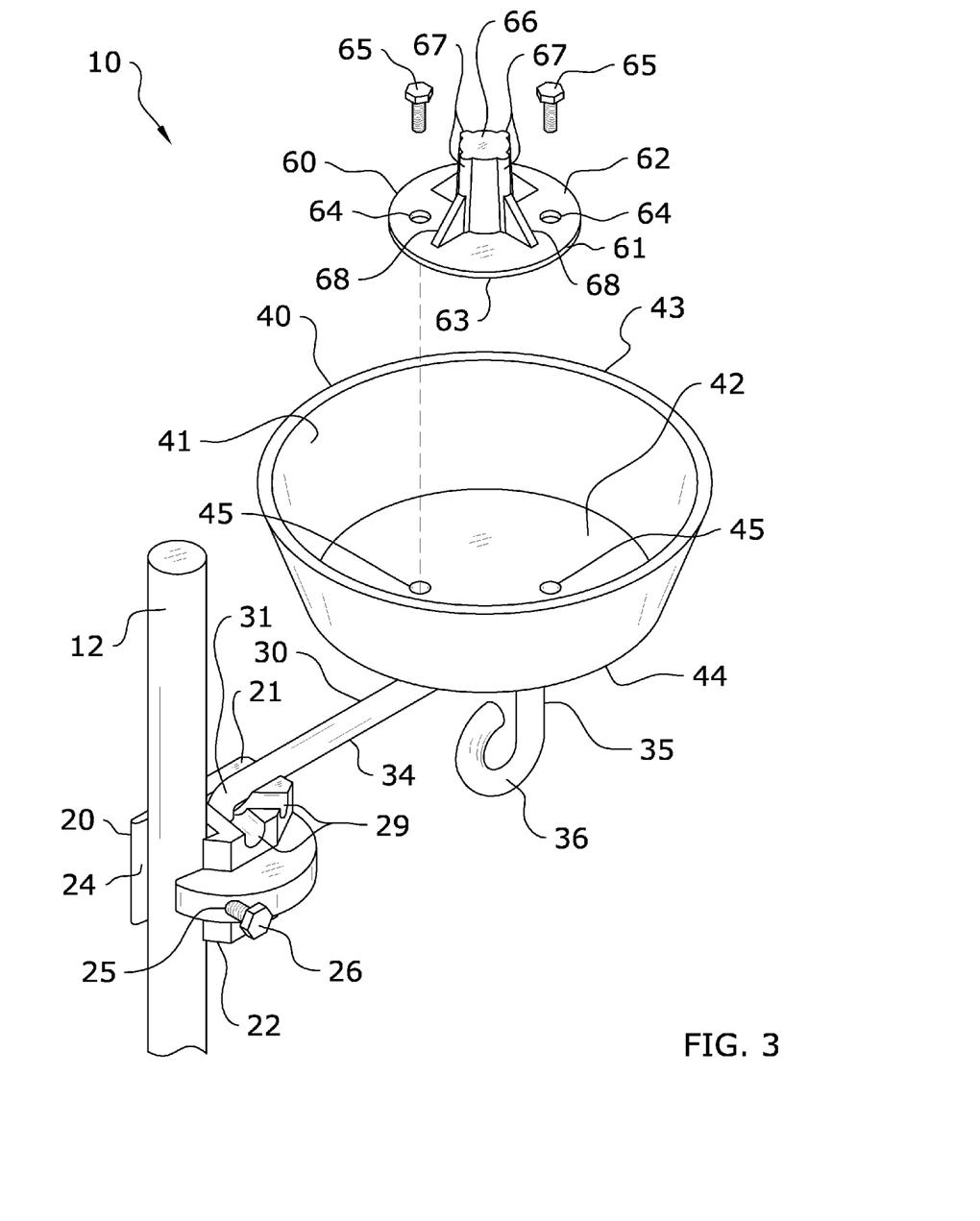
FIG. 3 is an upper perspective view of the present invention illustrating alignment of the dispenser holder within the dish member.
Figure 5:
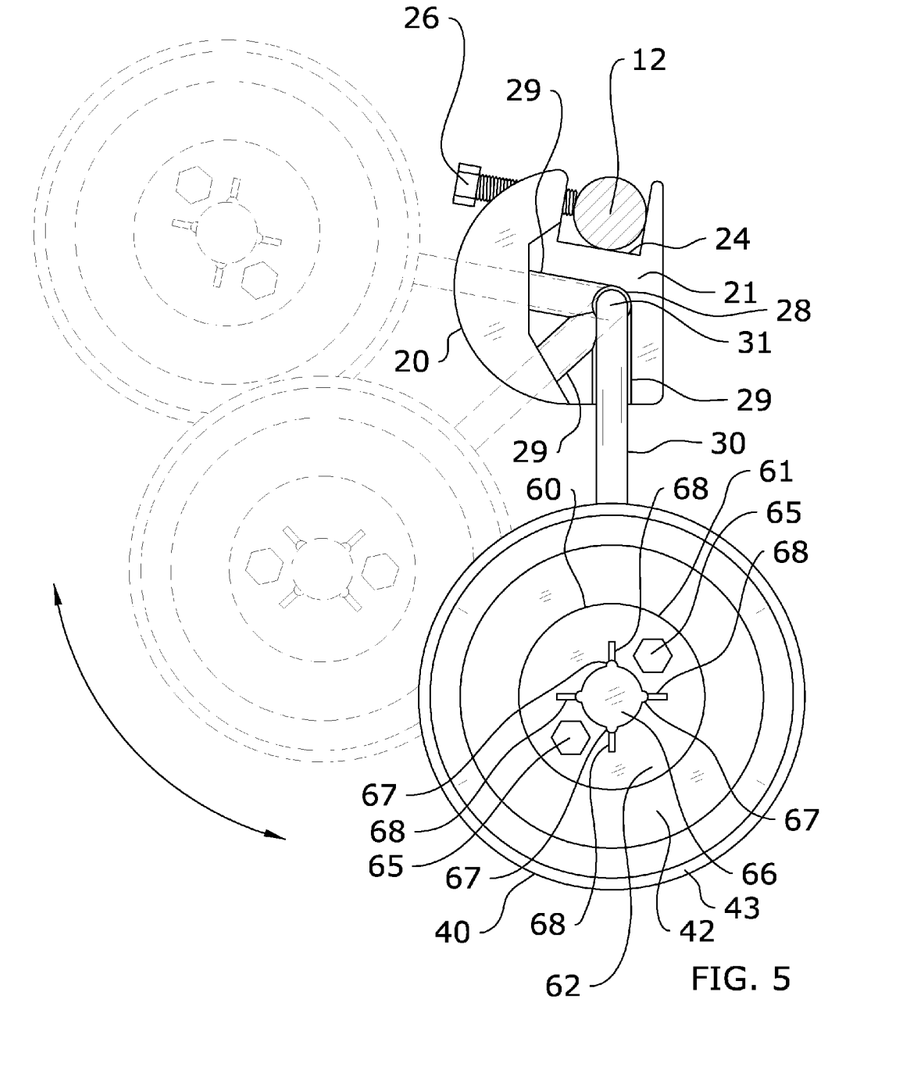
FIG. 5 is a top view of the present invention illustrating various positions of the dish member and attachment member.
Figure 6:
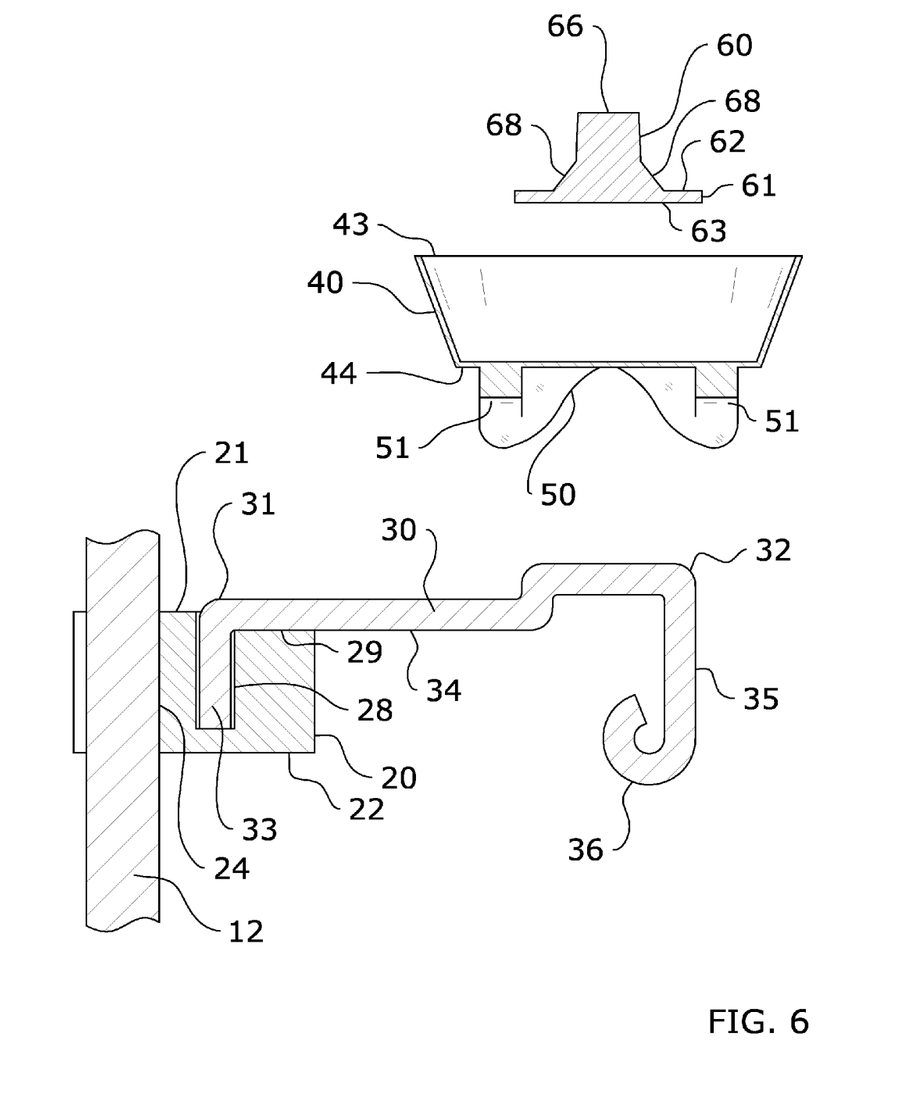
FIG. 6 is an exploded side sectional view of the present invention.
Figure 7:
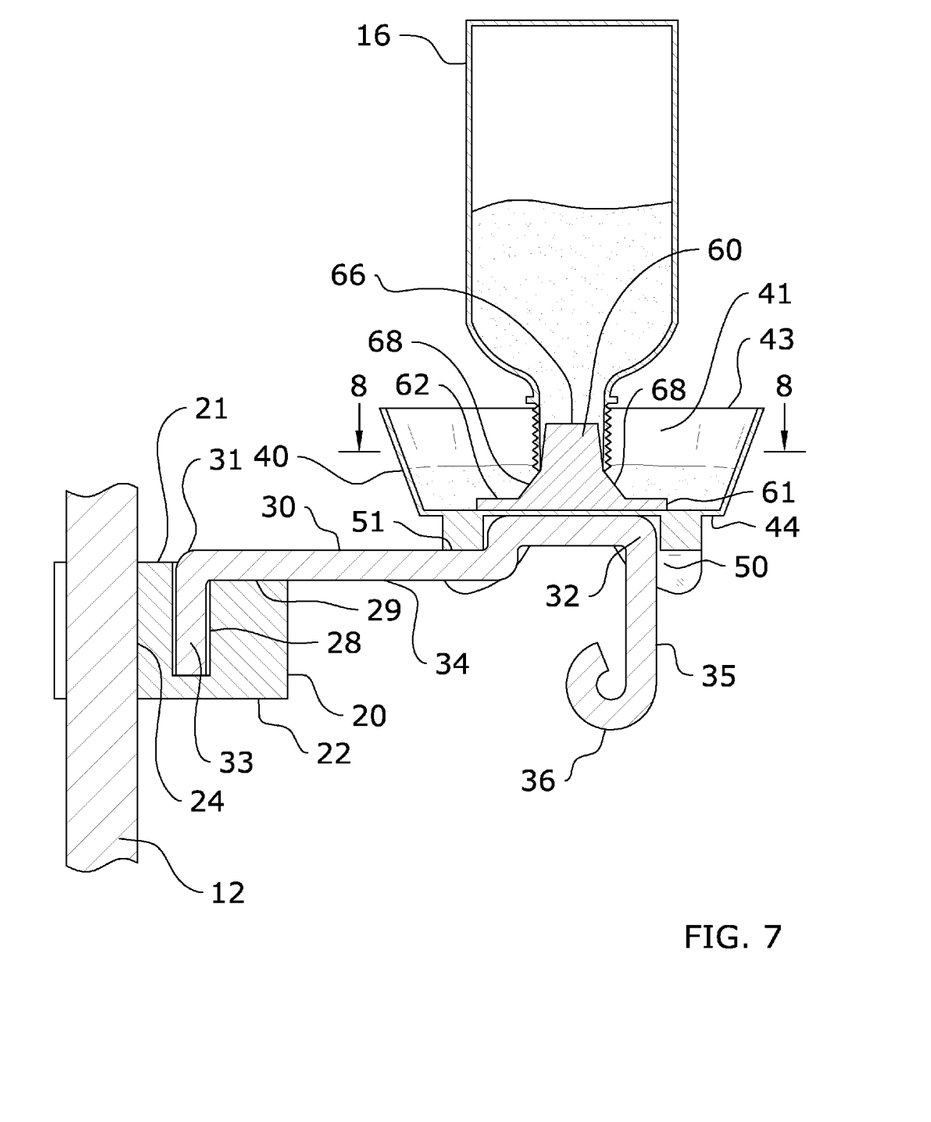
FIG. 7 is a side sectional view of the present invention in use.
Figure 8:
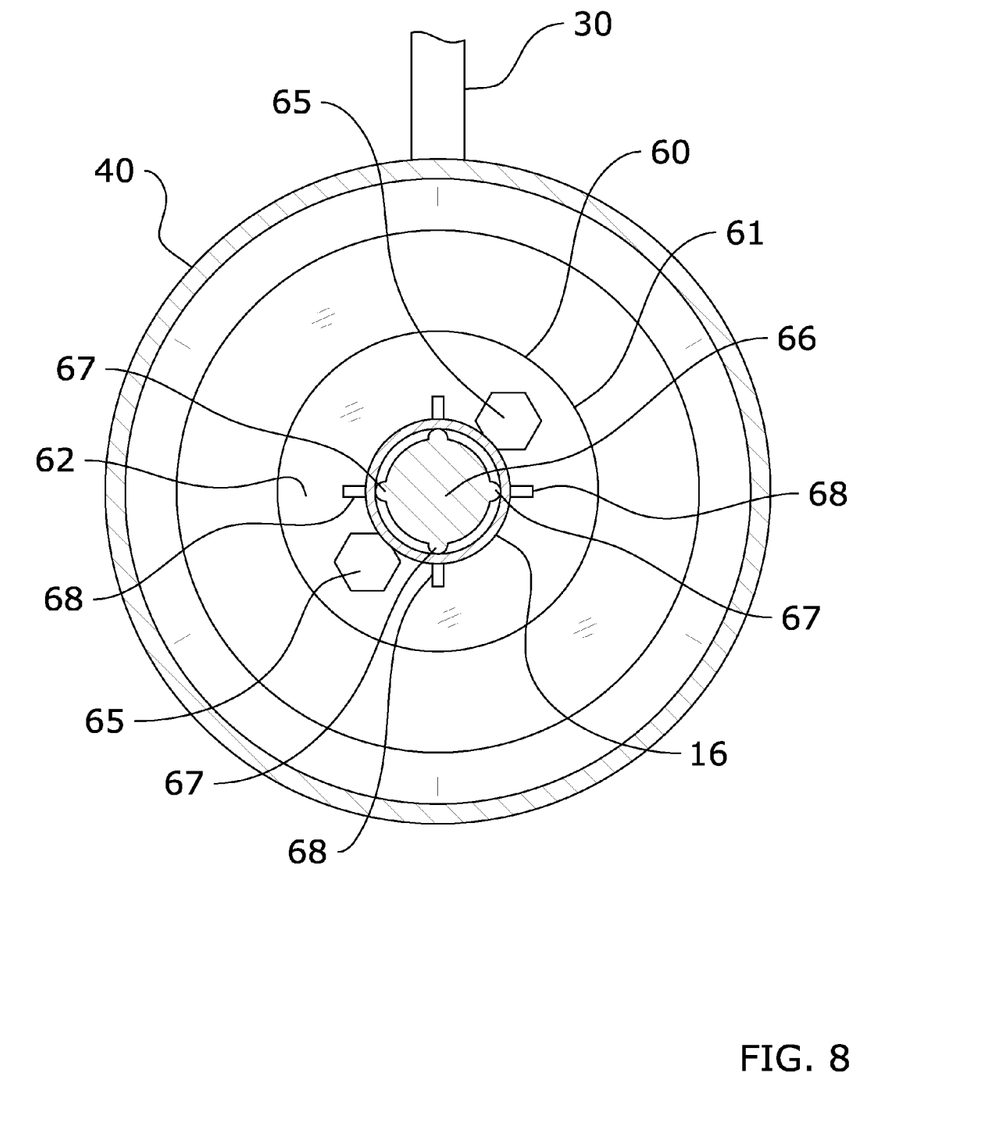
FIG. 8 is a top sectional view of the present invention taken along line 8-8 of FIG. 7.

The upper end 21 of the clamp member 20 also preferably includes a plurality of positioning notches 29 as shown in FIG. 3. Each such notch 29 provides a discrete position in which the attachment member 30 may rest so as to allow the positioning of the attachment member 30 to be adjustable as shown in FIG. 5. The positioning notches 29 are generally formed within the upper end 21 of the clamp member 20 and each are linked directly with the mounting aperture 28. Preferably, the positioning notches 29 will extend outwardly in multiple directions from the central mounting aperture 28. Various positions, configurations and numbering of the positioning notches 29 may be utilized so long as the clamp member 20 is adapted to allow multiple positions for the attachment member 30.

Figure 9:
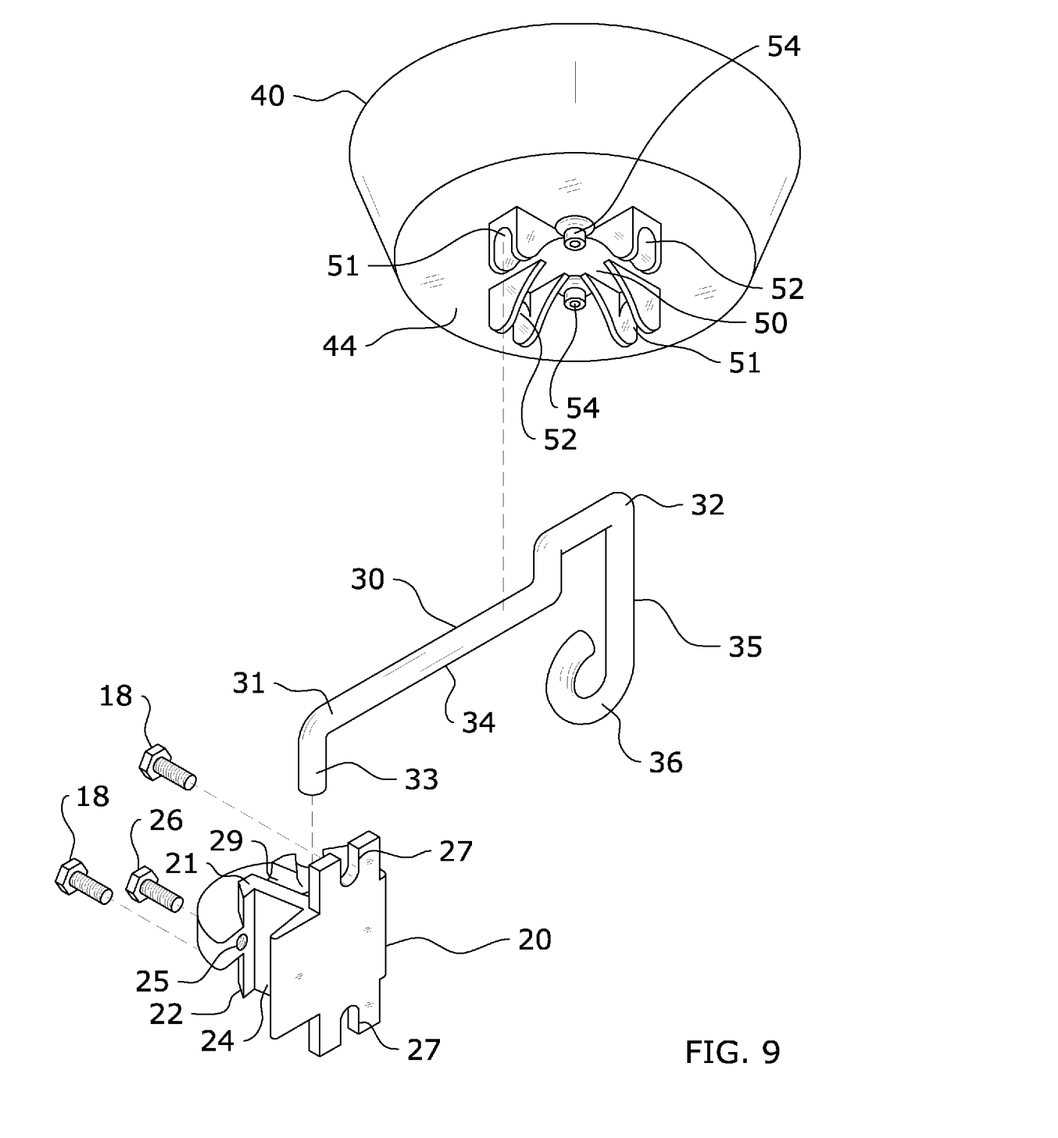
FIG. 9 is an upper perspective view of an alternate embodiment of the present invention.

As shown in FIG. 9, some embodiments of the present invention will include one or more wall mount slots 27 formed within the body of the clamp member 20 to allow the present invention to optionally be mounted on a vertical surface such as an outside wall or plank of wood. The wall mount slots 27 generally extend vertically into the upper and lower ends of the clamp member 20 and are adapted to receive fasteners 18 such as bolts to secure the clamp member 20 to the surface.

C. Attachment Member

Figure 4:
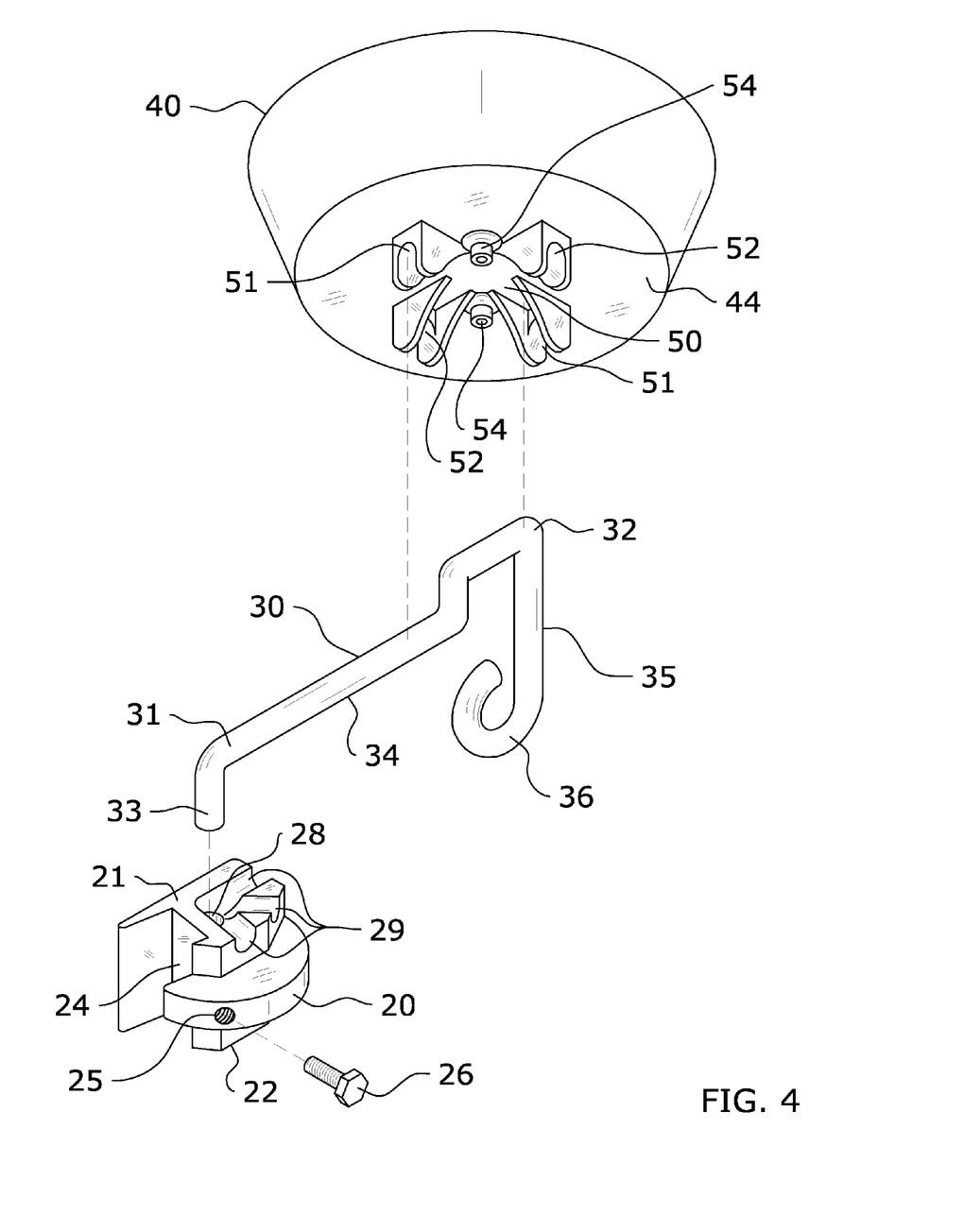
FIG. 4 is a lower perspective view of the present invention illustrating alignment of the attachment member with the clamp member and dish mount member.

As shown in FIG. 4, the present invention includes an attachment member 30 which is secured at a first end 31 to the clamp member 30 and which is adapted at its second end 32 to hold a dish member 40. The attachment member 30 is generally comprised of an elongated member and is made of plastic, metal or various metal alloys. It is appreciated that the size, shape and configuration of the attachment member 30 may vary for different embodiments.

The attachment member 30 generally includes a mounting portion 33 positioned at its first end 31 as shown in FIG. 4. The mounting portion 33 is generally comprised of a downward-facing portion which is adapted to be inserted into and retained within the mounting aperture 28 of the clamp member 20.

A horizontal portion 34 links the first end 31 and the second end 32 of the attachment member 30. The horizontal portion 34 is adapted to be positioned within one of the slots 51, 52 of the dish mount member 50 so as to retain the dish member 40 on the attachment member 30 as shown in FIG. 4. As shown therein, a portion of the horizontal portion 34 may be slightly raised adjacent its second end 32 to aid in making such a connection. The second end 32 of the attachment member 30 also includes a downward projection 35 which terminates in a hook member 36, which may be utilized to suspend various objects such as a hanging plant 14.

D. Dish Member and Dish Mount

As shown in FIG. 1, the present invention also includes a dish member 40 which may be removably secured to the attachment member 30. The dish member 40 may be utilized for various purposes, such as a water feeder or bird feeder. The dish member 40 may be comprised of various shapes and configurations. While the figures illustrate a circular dish member 40, it is appreciated that square-shaped dish members along with various other shapes may be utilized and thus the present invention should not be construed as being limited to the exemplary dish member 40 configuration shown in the figures.

The upper end 43 of the dish member 40 includes a cavity 41 for storing various substances. The dish member 40 also includes a floor 42 for retaining the substances within the cavity 41. The lower end 44 of the dish member 40 includes the dish mount member 50 of the present invention. A pair of dish apertures 45 generally extend through the floor 42 of the dish member 40, the apertures 45 being used to secure the dispenser holder 60 within the dish member 40.

The dish mount member 50 of the present invention is secured to the lower end 44 of the dish member 40 as shown in FIG. 4. The dish mount member 50 is utilized to mount the dish member 40 onto the attachment member 30 when the present invention is in use. The dish mount member 50 may be comprised of a wide range of configurations, and thus should not be construed as being limited to the exemplary configuration shown in the figures.

The dish mount member 50 includes a pair of slots 51, 52 which are utilized to receive and retain the horizontal portion 34 of the attachment member 30 to allow the dish member 40 to be mounted on the attachment member 30. The slots 51, 52 may be defined in various ways, such as downwardly projecting clamps as shown in the figures. In other embodiments, the slots 51, 52 may extend directly into the lower end of the dish member 40, thus negating the requirement of a separate disc mount member 50. A first slot 51 will be provided to place the dish member 40 in a first position and a second slot 52 will be provided to place the dish member 40 in a second position. Preferably, the slots 51, 52 will be oriented perpendicularly with respect to each other.

The dish mount member 50 will also generally include a pair of fastener anchors 54. Each fastener anchor 54 is positioned directly underneath a corresponding dish aperture 45 to provide an anchor into which the holder fasteners 65 will be inserted to secure the dispenser holder 60 to the floor 42 of the dish member 40.

E. Dispenser Holder

The present invention includes a removably-secured dispenser holder 60 which is adapted to retain a dispenser 16 such as a bottle within the dish member 40. It is appreciated that, while the figures illustrate use of a bottle as the dispenser 16, various other structures may be secured to the present invention, such as bird feeders and the like.

The dispenser holder 60 is generally comprised of a base 61 having an upper end 62 and a lower end 63, wherein a dispenser mount 66 extends upwardly from the upper end 62 of the base 61. The base 61 may be comprised of various configurations, such as the circular configuration shown in the figures.

A pair of holder apertures 64 generally extend through the base 61 of the dispenser holder 60. These apertures 64 are aligned with the dish apertures 45 of the dish member 40 to as to receive holder fasteners 65 such as bolts which act to secure the dispenser holder 60 within the dish member 40.

The dispenser mount 66 is generally comprised of an upwardly-projecting structure which may include a circular cross-section as shown in FIG. 3. A plurality of ribs 67 extend vertically and outwardly from the outer circumference of the dispenser mount 66. The ribs 67 act to allow space for the fluid or other material within the dispenser 16 to be dispensed into the dish member 40 through the gaps between the ribs 67 and the dispenser mount 66 itself. Rim stoppers 68 will be secured to the upper end 62 of the base 61, positioned radially around the dispenser mount 66. The rim stoppers 68 ensure a gap between the rim of the dispenser 16 and the floor 42 of the dish member 40.

F. Operation of Preferred Embodiment

In use, the clamp member 20 is first secured to the stake 12 by positioning the vertical slot 24 around the stake's 12 body and tightening the securing member 26 through the locking aperture 25. The mounting portion 33 of the attachment member 30 may then be inserted within the mounting aperture 28 of the clamp member 20 and secured within one of the positioning notches 29, depending on the desired placement of the attachment member 30 relative to the stake 12.

The dish member 40 may then be secured to the attachment member 30 by positioning one of the slots 51, 52 of the dish mount member 50 over the horizontal portion 34 of the attachment member 30 as shown in FIG. 4. The dish member 40 is thus mounted on the attachment member 30. The dispenser holder 60 may optionally be installed by securing it to the floor 42 of the dish member 40 utilizing the holder fasteners 65 extending through the holder apertures 64 and anchored by the fastener anchors 54 of the dish mount member 50.

A dispenser 16 may be positioned over the dispenser holder 60 upside-down such that any fluid or material therein will be dispensed until it reaches the level of the dispenser's 16 outlet. As the fluid or material is depleted from within the dish member 40, additional fluid or material will be expelled from the dispenser 16 automatically until the outlet is reached again. Optionally, a structure such as a hanging plant 14 may be secured to the hook member 36.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:
1. An accessory attachment system, comprising:
a clamp member adapted to secure to a stake;
an attachment member adapted to be removably secured to said clamp member, wherein said attachment member comprises a vertical mounting portion for removably securing within said clamp member, a horizontal portion having a first end extending from said mounting portion, a downward portion extending downwardly from a second end of said horizontal portion, and a hook positioned at a distal end of said downward portion;
a dish member adapted to be removably secured to said attachment member, wherein said hook extends directly underneath said dish member; and
a dish mount member positioned on a lower end of said dish member, wherein said dish mount member includes first slot and a second slot, wherein said first slot and said second slot are oriented perpendicularly with respect to each other and defined by a plurality of clamps extending from said dish mount member, wherein said horizontal portion of said attachment member is removably positioned within said first slot or said second slot.

2. The accessory attachment system of claim 1, wherein said stake is comprised of a shepherd's hook.

3. The accessory attachment system of claim 1, wherein said clamp member includes a vertical slot for receiving said stake.

4. The accessory attachment system of claim 3, wherein said clamp member includes a mounting aperture and a securing member for securing said attachment member within said vertical slot.

5. The accessory attachment system of claim 1, wherein said attachment member includes a mounting portion adapted to be positioned within a mounting aperture within said clamp member.

6. The accessory attachment system of claim 1, further comprising a dispenser holder removably secured to said dish member.

7. The accessory attachment system of claim 6, wherein said dispenser holder is comprised of a base and a dispenser mount extending upwardly from said base.

8. The accessory attachment system of claim 7, further comprising one or more ribs extending outwardly from said dispenser mount.

9. The accessory attachment system of claim 8, further comprising rim stoppers extending radially outward from said base.

10. An accessory attachment system, comprising:
a clamp member adapted to secure to a stake, wherein said clamp member includes a vertical slot and a mounting aperture, wherein said stake is positioned within said vertical slot;
an attachment member adapted to be removably secured to said clamp member, wherein a first end of said attachment member is positioned within said mounting aperture;
a dish member adapted to be removably secured to said attachment member; and
a dish mount member positioned on a lower end of said dish member, wherein said dish mount member includes a first slot and a second slot, wherein said first slot and said second slot are oriented perpendicularly with respect to each other and defined by a plurality of clamps extending from said dish mount member, wherein said horizontal portion of said attachment member is removably positioned within said first slot or said second slot; wherein a second end of said attachment member is removably positioned within said first slot or said second slot.

11. The accessory attachment system of claim 10, wherein said attachment member includes a hook member.

12. The accessory attachment system of claim 10, further comprising a dispenser holder removably secured to said dish member.

13. The accessory attachment system of claim 12, wherein said dispenser holder is comprised of a base and a dispenser mount extending upwardly from said base.

14. The accessory attachment system of claim 13, further comprising one or more ribs extending outwardly from said dispenser mount.

15. The accessory attachment system of claim 14, further comprising rim stoppers extending radially outward from said base.

* * * * *